US010116995B2

(12) United States Patent
Eklund et al.

(10) Patent No.: US 10,116,995 B2
(45) Date of Patent: *Oct. 30, 2018

(54) SYSTEM AND METHOD FOR ORGANIZING GROUP CONTENT PRESENTATIONS AND GROUP COMMUNICATIONS DURING THE SAME

(71) Applicants: Sony Corporation, Tokyo (JP); Sony Pictures Entertainment Inc., Culver City, CA (US)

(72) Inventors: Don Charles Eklund, Yorba Linda, CA (US); Ben Feingold, Beverly Hills, CA (US)

(73) Assignees: SONY CORPORATION, Tokyo (JP); SONY PICTURES ENTERTAINMENT INC., Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/479,721

(22) Filed: Sep. 8, 2014

(65) Prior Publication Data
US 2015/0128175 A1 May 7, 2015

Related U.S. Application Data

(63) Continuation of application No. 11/688,252, filed on Mar. 19, 2007, now Pat. No. 8,832,760.
(Continued)

(51) Int. Cl.
H04N 21/4788 (2011.01)
H04N 21/6587 (2011.01)
(Continued)

(52) U.S. Cl.
CPC .......... H04N 21/4788 (2013.01); G09B 5/06 (2013.01); G09B 5/065 (2013.01); H04N 21/43 (2013.01);
(Continued)

(58) Field of Classification Search
CPC .... H04N 7/15; H04N 21/242; H04N 21/4788; H04N 21/632; H04N 21/482;
(Continued)

(56) References Cited

U.S. PATENT DOCUMENTS 5,808,662 A 9/1998 Kinney et al.
6,857,006 B1 2/2005 Nishizawa
(Continued)

FOREIGN PATENT DOCUMENTS

EP 1111926 6/2001
EP 1357754 10/2003
(Continued)

OTHER PUBLICATIONS

Coates, T., "Social Software for Set-Top boxes . . . " plasticbag.org, Mar. 23, 2005, pp. 1-15, http://www.palsticbag.org/archives/2005/03/social_software_for_settop_boxes/.

Primary Examiner — Benjamin R Bruckart
Assistant Examiner — Aklil M Tesfaye
(74) Attorney, Agent, or Firm — Mayer & Williams, PC

(57) ABSTRACT

A system and method are provided that allow the presentation of content to multiple users while some or all of the users communicate with one another through a network. In some embodiments, a content item such as a movie is viewed synchronously by multiple users while the users interact through, e.g., instant messaging. A viewing event may be arranged with users receiving invitations, responding to the invitations, and receiving reminders about the viewing event. The viewing event allows for contests to be conducted between the users. The users may be charged fees to participate in the viewing event. Items for sale may be offered to the users, such as a copy of the content item.

18 Claims, 7 Drawing Sheets

Related U.S. Application Data

(60) Provisional application No. 60/783,712, filed on Mar. 17, 2006.

(51) Int. Cl.

| | | |
|---|---|---|
| *H04N 21/45* | (2011.01) | |
| *H04N 21/43* | (2011.01) | |
| *H04N 21/482* | (2011.01) | |
| *H04N 21/475* | (2011.01) | |
| *H04N 21/81* | (2011.01) | |
| *G09B 5/06* | (2006.01) | |

(52) U.S. Cl.
CPC ..... *H04N 21/4508* (2013.01); *H04N 21/4758* (2013.01); *H04N 21/482* (2013.01); *H04N 21/6587* (2013.01); *A63F 2300/66* (2013.01); *A63F 2300/8011* (2013.01); *H04N 21/812* (2013.01)

(58) Field of Classification Search
CPC .......... H04N 21/6587; H04N 21/4508; H04N 21/43; H04N 21/4785; H04N 21/64508; H04N 21/812; H04N 21/4758; G09B 5/06; G09B 5/065; A63F 2300/66; A63F 2300/8011
See application file for complete search history.

(56) References Cited

U.S. PATENT DOCUMENTS

| | | | |
|---|---|---|---|
| 7,036,083 B1 | 4/2006 | Zenith | |
| 7,114,172 B2 | 9/2006 | Lord | |
| 7,130,404 B2 | 10/2006 | Coles et al. | |
| 7,441,199 B2 | 10/2008 | Zenith | |
| 2002/0067909 A1 | 6/2002 | Iivonen | |
| 2002/0078440 A1* | 6/2002 | Feinberg | H04N 5/44543 725/9 |
| 2002/0112244 A1 | 8/2002 | Liou et al. | |
| 2002/0116613 A1 | 8/2002 | Fujii et al. | |
| 2002/0144273 A1 | 10/2002 | Reto | |
| 2003/0004773 A1* | 1/2003 | Clark | G06Q 10/109 705/7.19 |
| 2003/0088875 A1 | 5/2003 | Gay et al. | |
| 2003/0088878 A1 | 5/2003 | Rogers et al. | |
| 2003/0156827 A1 | 8/2003 | Nishizawa | |
| 2004/0009813 A1 | 1/2004 | Wind | |
| 2004/0103150 A1 | 5/2004 | Ogdon et al. | |
| 2004/0194142 A1 | 9/2004 | Jiang et al. | |
| 2004/0246951 A1 | 12/2004 | Parker et al. | |
| 2004/0260753 A1 | 12/2004 | Regan | |
| 2005/0005303 A1 | 1/2005 | Barone et al. | |
| 2005/0018826 A1* | 1/2005 | Benco | H04M 3/565 379/202.01 |
| 2005/0066362 A1 | 3/2005 | Rambo | |
| 2005/0066363 A1 | 3/2005 | Rambo | |
| 2005/0066364 A1 | 3/2005 | Rambo | |
| 2005/0066365 A1 | 3/2005 | Rambo | |
| 2005/0091694 A1 | 4/2005 | Rambo | |
| 2005/0166242 A1* | 7/2005 | Matsumoto | H04N 5/76 725/88 |
| 2005/0193102 A1 | 9/2005 | Horvitz | |
| 2005/0209914 A1 | 9/2005 | Nguyen et al. | |
| 2005/0239036 A1 | 10/2005 | McGar et al. | |
| 2005/0262542 A1 | 11/2005 | DeWeese et al. | |
| 2006/0053196 A1* | 3/2006 | Spataro | H04L 65/403 709/205 |
| 2006/0136960 A1 | 6/2006 | Morris | |
| 2006/0236352 A1* | 10/2006 | Scott, III | H04N 5/76 725/89 |
| 2006/0271960 A1 | 11/2006 | Jacoby et al. | |
| 2007/0077994 A1* | 4/2007 | Betteridge | G07F 17/32 463/42 |
| 2007/0192803 A1 | 8/2007 | Chisaka | |

FOREIGN PATENT DOCUMENTS

| | | |
|---|---|---|
| JP | 2002290956 | 10/2002 |
| JP | 2003345761 | 12/2003 |
| JP | 2005235170 | 9/2005 |
| JP | 2005244605 | 9/2005 |
| JP | 2006041888 | 2/2006 |
| WO | 1998021664 | 5/1998 |
| WO | 00/13416 | 3/2000 |
| WO | 03/085928 | 3/2003 |
| WO | 03030547 | 4/2003 |
| WO | 03/045058 | 5/2003 |
| WO | 2004104758 | 12/2004 |
| WO | 2005/069296 | 1/2005 |
| WO | 2005/106685 | 11/2005 |
| WO | 2006011754 | 2/2006 |
| WO | 2006090395 | 8/2006 |

* cited by examiner

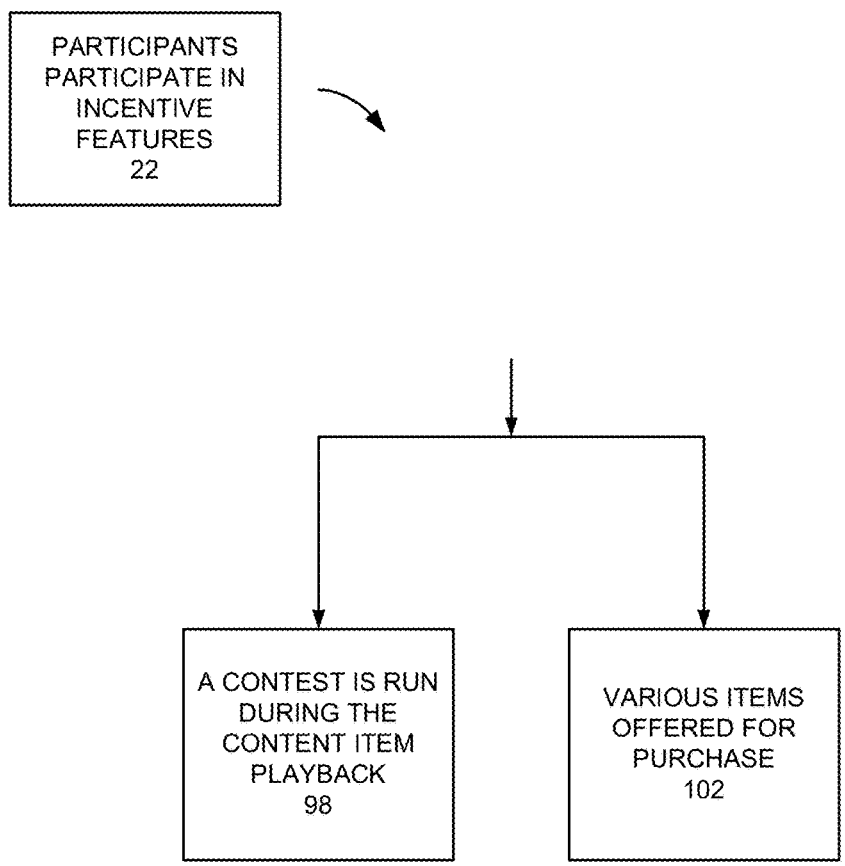

SYSTEM AND METHOD FOR ORGANIZING GROUP CONTENT PRESENTATIONS AND GROUP COMMUNICATIONS DURING THE SAME

STATEMENT OF RELATED APPLICATION

This application is a continuation of U.S. patent application Ser. No. 11/688,252, filed Mar. 19, 2007, now U.S. Pat. No. 8,832,760, issued Sep. 9, 2014 entitled "System and Method for Organizing Group Content Presentations and Group Communications During the Same", which claims the benefit of U.S. Provisional Patent Application No. 60/783,712, filed Mar. 17, 2006, entitled "Chat Cinema", which is incorporated herein by reference in its entirety.

FIELD OF THE INVENTION

The invention relates to group viewing of content, and in particular to group organization and communications between group participants during the group viewing.

BACKGROUND

Systems are known that allow the viewing of a television program on a computer system while simultaneously allowing a chat channel to form a portion of the computer display window.

Such prior art disclosures suffer from various drawbacks, however. For example, they lack convenient ways to organize a group to watch the same program simultaneously, and further lack ways to incentivize the group to watch and communicate with each other during the program, increasing enjoyment by the participants.

SUMMARY

Systems and methods are provided to organize group presentations of content items such as movies, and further to allow members of the group to communicate during the same.

The systems and methods are typically embodied in a software application that is downloaded from a server. The application allows a user to set up a viewing event by inviting potentially interested parties via, e.g., email, or instant or text messaging. The server organizes those who accept the invitation into a viewing event group, and provides reminders to the group. The system also arranges for installation of the application from the server on group systems that lack it.

The movie may be located on the user's computer, a participant's computer, or a file-sharing server, and may be downloaded to participants' computers prior to the viewing event, or with a fast internet connection it may be streamed instead.

During the viewing event, the movie is viewed by all participants at the same time. An authorized participant, or in another implementation any participant, may provide trick play during the playback. The participants may communicate with each other during playback via, e.g., instant messaging, VOIP, etc. For example, the movie playback may appear in one window while instant message communications appear in another.

Enhancements may include charging fees to participants, offering items for sale to participants (e.g., a copy of the movie), or conducting contests for participants.

While the content discussed is movies, various other types of content may be provided for, including any type of recorded video or audio event or production.

In one aspect, the invention is directed to a method of conducting a viewing event of a content item for a prearranged group of participants and for providing communications therebetween, including: receiving identification information about at least two potential participants of a group for a viewing event, each potential participant having a system for playing back the viewing event; transmitting an invitation to the at least two potential participants to join the group for the viewing event; receiving responses from one or more of the potential participants; and if the response is to accept the invitation to join the group, then enrolling the corresponding potential participant in the group of participants, and determining if the corresponding participant's system has a viewing event application disposed thereon, and if the corresponding participant's system does not have a viewing event application disposed thereon, then downloading a copy of the viewing event application to the participant's system, wherein the identification information includes at least information corresponding to the setup of a chat channel for the participant to the group.

Implementations of the invention may include one or more of the following. If the response is to accept the invitation to join the group, then the method further includes determining the connection bandwidth of the system corresponding to the participant, and determining if all or a portion of the content item should be encrypted and downloaded to the participant's system prior to the beginning of the viewing event, or if the content item should be streamed continuously to the participant's system. The encryption then serves to disallow playback of the content item prior to the beginning of the viewing event. The determining may also include querying the participant about the connection type of their system.

In another aspect, the invention is directed to a method of organizing a viewing event of a content item for a prearranged group of participants and for providing communications therebetween, including: sending a signal to each participant's system, the signal acting to synchronously begin playback of the content item, whereby the viewing event is begun; and operating a chat channel before, during, or after the viewing event.

Implementations of the invention may include one or more of the following. The method may further include providing a trick play capability for one or more authorized participants.

In yet another aspect, the invention is directed to a method of organizing a viewing event of a content item for a prearranged group of participants and for providing communications therebetween, including: synchronously beginning playback of the content item on each participant's system at a predetermined time, whereby the viewing event is begun; and operating a chat channel before, during, or after the viewing event.

In a further aspect, the invention is directed to a server-based system for conducting and organizing a viewing event of a content item for a prearranged group of participants and for providing communications therebetween, including at least one server with the following modules implemented in hardware or software: an organization module, the organization module configured to: receive identification information about at least two potential participants of a group for a viewing event, each potential participant having a system for playing back the viewing event; invite the at least two potential participants to join the group for the viewing event;

receive responses from one or more of the potential participants; and if the response is to accept the invitation to join the group, then the organization module is configured to enroll the corresponding potential participant in the group of participants, and determine if the corresponding participant's system has a viewing event application disposed thereon, and if the corresponding participant's system does not have a viewing event application disposed thereon, then the organization module is configured to download a copy of the viewing event application to the participant's system. The server-based system also includes a viewing event module, the viewing event module configured to: synchronously begin playback of the content item, whereby the viewing event is begun; and operate a chat channel before, during, or after the viewing event.

Implementations of the invention may include one or more of the following. The organization module and the viewing event module may be located on the same server or on different servers. If the response is to accept the invitation to join the group, then the organization module may be further configured to determine the connection bandwidth of the system corresponding to the participant, and determine if all or a portion of the content item should be encrypted and downloaded to the participant's system prior to the beginning of the viewing event, or if the content item should be streamed continuously to the participant's system. The system may further include an incentive module, the incentive module configured to send to each participant's system a message selected from the group consisting of: an offer for sale of an item related to the content item, a question about the content item, or an offer to participate in a contest about the content item. The viewing event module may be further configured to allow trick playback of a content item by at least one authorized participant, the trick playback appearing on all systems of the group. The trick playback may alternatively be allowed for at least one authorized participant, the trick playback appearing on only the authorized participant's system. In this case, following trick playback of a content item by only an authorized participant, the viewing event module may be configured to resynchronize all group systems to a common location in the playback of the content item. The viewing event module may also be configured to synchronously begin playback by sending a signal to each participant's system, the signal causing playback or streaming of the content item. Alternatively, the playback may be synchronously begun at a predetermined time.

The invention further includes, for all methods, a computer readable medium containing instructions for causing a computer to implement the methods.

Advantages of the invention may include one or more of the following. A group of participants may be organized to view a movie at the same time, each from a separate computer system. The group may communicate among themselves during the movie in a number of ways, including a group broadcast to all participants or a private message to an individual participant. The group may participate in contests or other ancillary events prior to, during, or after the movie Other advantages will be apparent from the description that follows, including the drawings and claims.

BRIEF DESCRIPTION OF THE DRAWINGS

FIG. 7 illustrates a more detailed flowchart of certain steps of the methods of FIG. 2, in particular, the method of offering incentive features to participants of the group.

DETAILED DESCRIPTION

Figure 1:
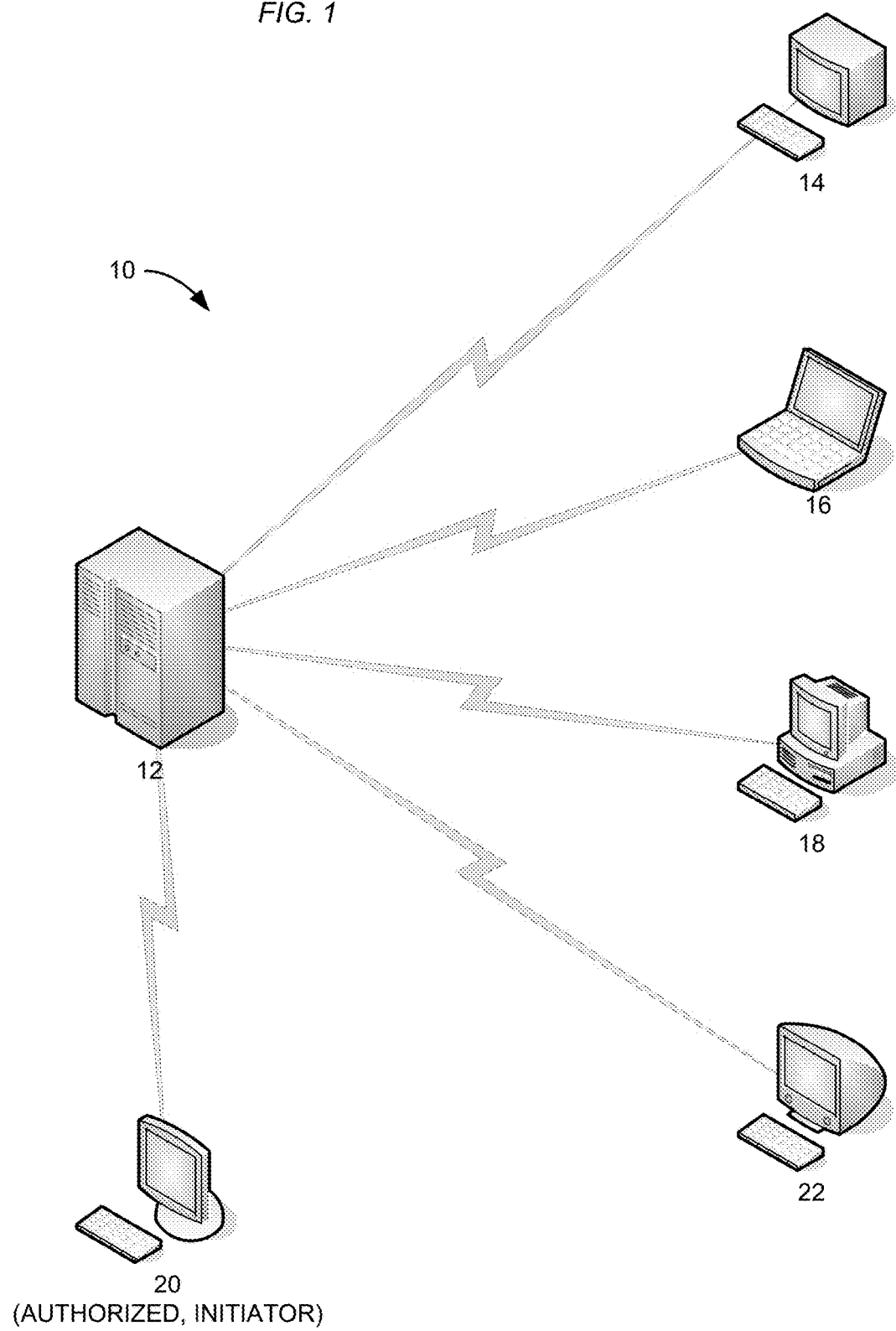
FIG. 1 illustrates a schematic diagram of a system according to an embodiment of the invention.

The following terms, defined here, are used throughout the specification and attached figures.

A "Viewing Event" refers to the playback and watching of one or more content items by a group. A viewing event typically has a beginning, a duration, and an ending, and these occur at substantially the same time for each participant (subject to various "trick play" operations performed by authorized participants). While the term "watching" is used in this definition, a viewing event may also pertain to an audio-only event. "Content items" played back during viewing events may be, e.g., movies, recorded or live television shows, audio content such as concerts, slideshows, debates, lectures, a video stream of an online event such as a video game competition, online educational tools where students can hold open chats for discussion, or any other type of presentation that a group of participants may view or listen to or both.

"Conducting" a viewing event refers to an act of operating a viewing event and providing for a chat channel before, during, and/or after the viewing event. For example, a server may conduct a viewing event of a movie by streaming a movie to each participant, and by further providing a chat channel so that participants may communicate with each other during the movie, e.g., about issues raised by the movie.

"Participants" refers to individuals who have accepted an invitation to join a group or who have otherwise indicated their interest in connecting to a viewing event or joining a group, such as may happen following the announcement of an event. A potential participant is one who has been or will be invited to join a group for a viewing event, but has not yet accepted the invitation. A participant is associated with a "system", which is typically some type of computer system on which the participant will take part in the viewing event, e.g., by watching a movie or other program, or listening to an audio event. A system thus has the capability of playing back a content item, and at least two systems in a given group have the capability of maintaining a chat channel. Examples of systems include, but are not limited to, desktop and notebook computer systems, game consoles, mobile phones, mobile computing devices (e.g., PDA's or game devices). A participant who is an "initiator" is the individual who initiated the group, such as by providing potential participants' contact information to a server or software application. An "authorized participant" is one who is accorded certain privileges, such as the ability to provide trick play for the playback for the entire group. In some embodiments, one or more participants may be able to control trick play. In these embodiments, especially where less-than-all participants have used trick play, or where participants have used trick play to different degrees, a "re-synchronization" function may be employed to allow all users to once again start watching the content item at a common point in the playback or for a user who has left the main viewing (e.g., though trick play) to rejoin the main viewing.

"Communications" between the participants refers to the use of a chat channel for communications between participants of a group. Not all participants need to have access to a chat channel, but typically at least two will.

"Synchronous Viewing" of a viewing event refers to substantially simultaneous viewing of a content item. Synchronous viewing may become desynchronized if participants employ trick play to different degrees.

"Streaming media" refers to media that is continuously received by, and normally displayed to, the participant while the same is being delivered by the provider. In this case, the provider could be any of the group participants' systems, or could alternatively be a server.

A "Chat Channel" refers to any kind of communication over a network (e.g., the Internet), and in particular to direct 1-on-1 or many-to-many chat or text-based chat, using tools such as instant messaging applications, chat applications, Internet Relay Chat, VOIP applications, and other messaging systems, which may be textual, audio, or video, or a combination of these. A "readable" chat channel is one that a participant can read, view, or listen to on their corresponding system. A "writable" chat channel is one in which a participant can take part or to which a participant can provide feedback or input.

"Rendering" or "Playing Back" refer to the act of displaying a content item. For example, rendering a content item that is a movie means to play back the movie in an appropriate media player. The media player may be any content playback device that is capable of playing back the selected type of content.

"Trick" play or playback refers to the use of various algorithms, implemented in hardware or software, that affect playback of a content item. For example, "regular" playback of a content item refers to a linear playback of the intended sequence of frames or other divisions of data within a content item. Trick playback refers to fast-forwarding, rewinding, skipping, or various other ways to non-linearly affect playback. If the playback of the content item to the entire group is subject to trick play, then the group viewing event will continue to be synchronized. However, if the degree of trick playback varies by participant, then the playback will become unsynchronized and a resynchronization may be desired.

A "group" refers to a defined group of users that are a target audience of a shared content item. A group is typically defined by a user, and often corresponds to that user's group of friends or other defined cohort. A group may also be constructed automatically, such as via an analysis of user settings in a separate application, such as a social networking service. A share group may also be created on a user system using, for example, contacts information such as is stored in Microsoft Outlook®.

The "Viewing Event Application" is software resident on a participant's system that allows the participant to view or listen to the content item and optionally to take part in a chat channel, e.g., about the content item. The viewing event application may be downloadable onto a participant's system, or may be provided via separate media. Alternatively, the viewing event application can be stored on and run from a server (e.g., through a web interface). In some cases, the viewing event application may allow a participant to organize a viewing event as well as to view the same. That is, the viewing event application may invite other potential participants to join a viewing event group and keep track of responses, or may cause a separate file server to do so. The viewing event application may also transfer to the participants in the viewing event group their own copies of the viewing event application, or may cause a separate file server to do so. The viewing event application may cause a content item to be transmitted, in whole or in part, or to stream, to other participants' systems at the time of a viewing event, or may cause a separate file server to do so. The viewing event application may initiate various incentives to be presented to participants before, during, or after a viewing event, or may cause a separate file server to do so.

An "incentive" is a presentation to one or more participants before, during, or after a viewing event. For example, incentives can include trivia questions about the content item, and the same may be part of a contest. An incentive may also be an item offered for sale that may be of interest to the participant, such as a copy of a DVD of the content item.

FIG. 1 shows a system 10 that may be employed to embody the present invention. In this figure, a file server 12 serves a number of potential participant's systems 14, 16, 18, 22, and 20. The system 20 may be designated as an authorized participant's system, for reasons discussed below, and in this embodiment also serves as an initiator system, i.e., one that initiates a viewing event, although in general the initiator need not be authorized.

The file server 12 may serve as a source or locator of content items, such as a movie or television program, or may only serve an administrative function of organizing and conducting a viewing event. Other potential sources of content items include any of the participants' systems, including that of the initiator, or other systems on the network (e.g., for segmented downloading).

In use, the system 10 allows different computer users or participants to synchronously watch the same content item, such as a movie, and to communicate via a chat channel, such as via instant messaging, at the same time. For example, during viewing, the viewing event software may display a two-pane window with the movie image in one pane and instant messages in the second pane.

Figure 2:
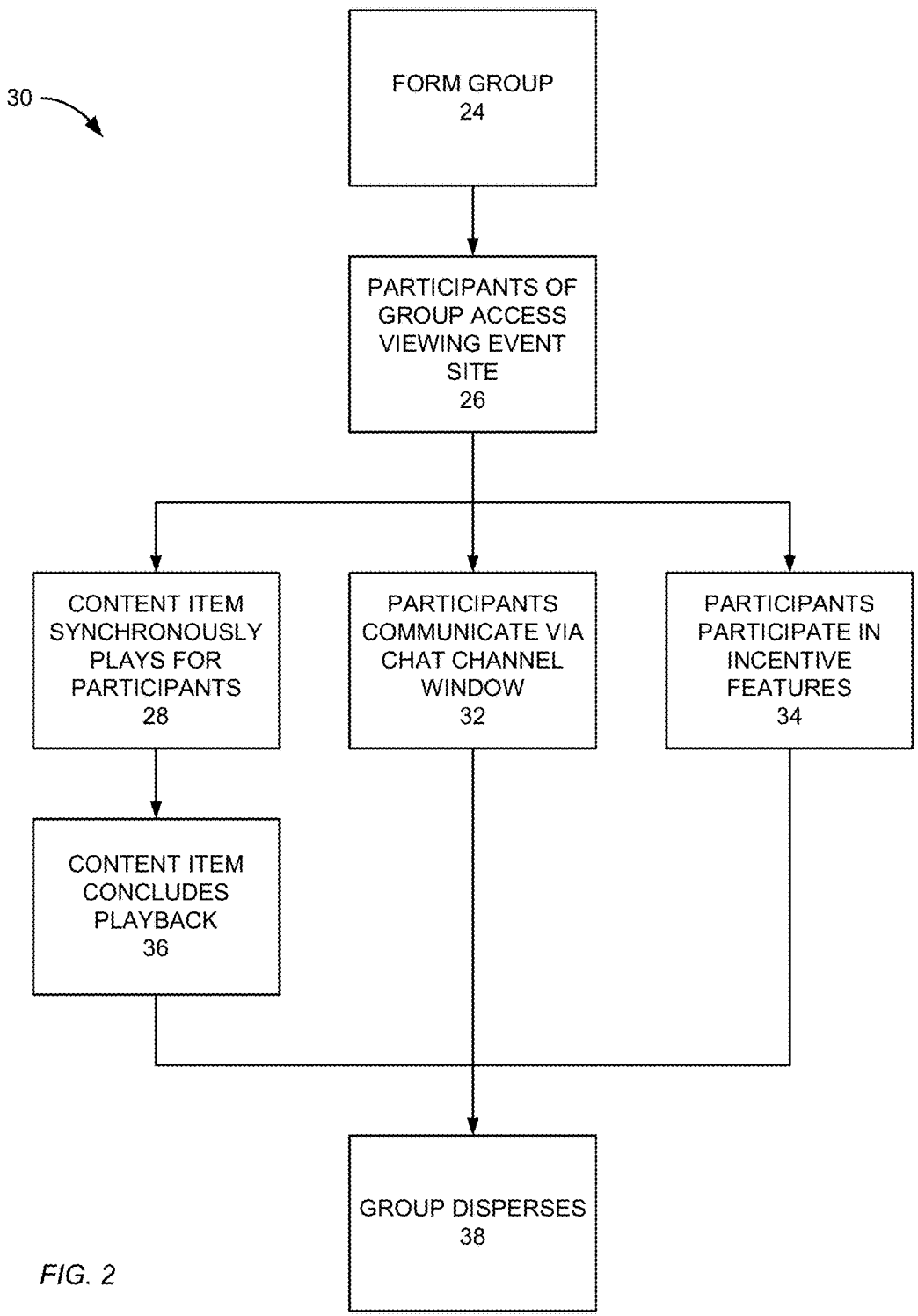
FIG. 2 illustrates a flowchart of certain methods embodying the invention.

An overall view of the methods 30 of certain embodiments of the invention is shown in FIG. 2. A group of participants is formed (step 24). The group accesses a site for the viewing event (step 26) where they are connected for synchronization and chat purposes. In an entirely peer-to-peer model, this site would be replaced by a peer system, such as the initiator's system. The content item plays in a synchronized fashion for the participants (step 28). The participants communicate via a chat channel before, during, or after the viewing event, or at a combination of these times (step 32). The participants may also take part in incentive features (step 34). Playback of the content item concludes (step 36), and the group may disperse (step 38).

These steps are now discussed in more detail below.

Organization of a Viewing Event

The initiator or initiating participant starts by downloading a copy of the viewing event application on their system (step 42), if one is not already present. The viewing event application may be resident on their system, or may be an entirely server-based application where none or only a portion of the application is resident on the participant's system. The initiator may then select the content item and a starting time for the viewing event (step 44). The choice of content item may be via a selection from a list of available content on their own system (step 46), on another participant's system (step 47), or on the file server (step 48). Accordingly, the content item may be provided through a client-server model or through a peer-to-peer model (e.g., direct or segmented downloading), or by a combination of both.

The starting time may also be mutually decided later, after a group is formed, by a polling of the available times for group participants.

The initiator then sends, or causes to be sent, invitations to potential participants (step 52). Participants who accept the invitation are then joined to the group (step 54). Alternatively, the invitation is sent out as a broadcast or multicast (e.g., to a defined group, such as friends or subscribers) announcement the need not be accepted apart from initiating participation in the viewing event. The viewing event application, or the file server, or a combination, may then check to see if the newly-joined participant has the viewing event application installed on their system (step 56). If so, they are immediately added to the group (step 62), and may also be automatically joined to the viewing event at the indicated time for the viewing event, or immediately if desired. If not, the viewing event application is downloaded to their system, or provided in another fashion, and the participant is added to the group (step 58). For example, a response to the accepted invitation may direct the participant to a network location (e.g., via a URL) that can provide the software and explain the system.

Fees may be charged for participation in a viewing event (step 55). The fee could be on a per-use or on a subscription basis. The participants may pay as needed or via a service account. In an alternative embodiment, no fees are charged. For example, users of another paid service may access the viewing event system as a promotion. Or, for promotional purposes, the viewing event system may be provided free of charge.

The viewing event application may send a reminder message to a participant to remind them of a viewing event (step 64). Such reminders may be emails, text messages, instant messages, or any other sort of communication. The reminder message may be sent by the initiator's viewing event application, the participant's viewing event application, or the file server, or a combination of these, depending on implementation. For example, the initiator's viewing event software may send a text message to each participant's mobile phone to remind them that an event is about to begin.

Just prior to the beginning of the viewing event, or even further in advance, a confirmation message may be sent from each participant's viewing event software to confirm their participation in the viewing event.

Also just prior to the beginning of the viewing event, the participants may access a site (step 26) that allows for the chat channel and ensures the viewing event and content item will begin at substantially the same time for all participants. The site may also conduct diagnostics or perform any other check to ensure the viewing event will operate properly on participants' systems. This access may occur automatically, if desired, so as to assist a participant to remember the occurrence of the viewing event.

Conducting a Viewing Event

Figure 3:
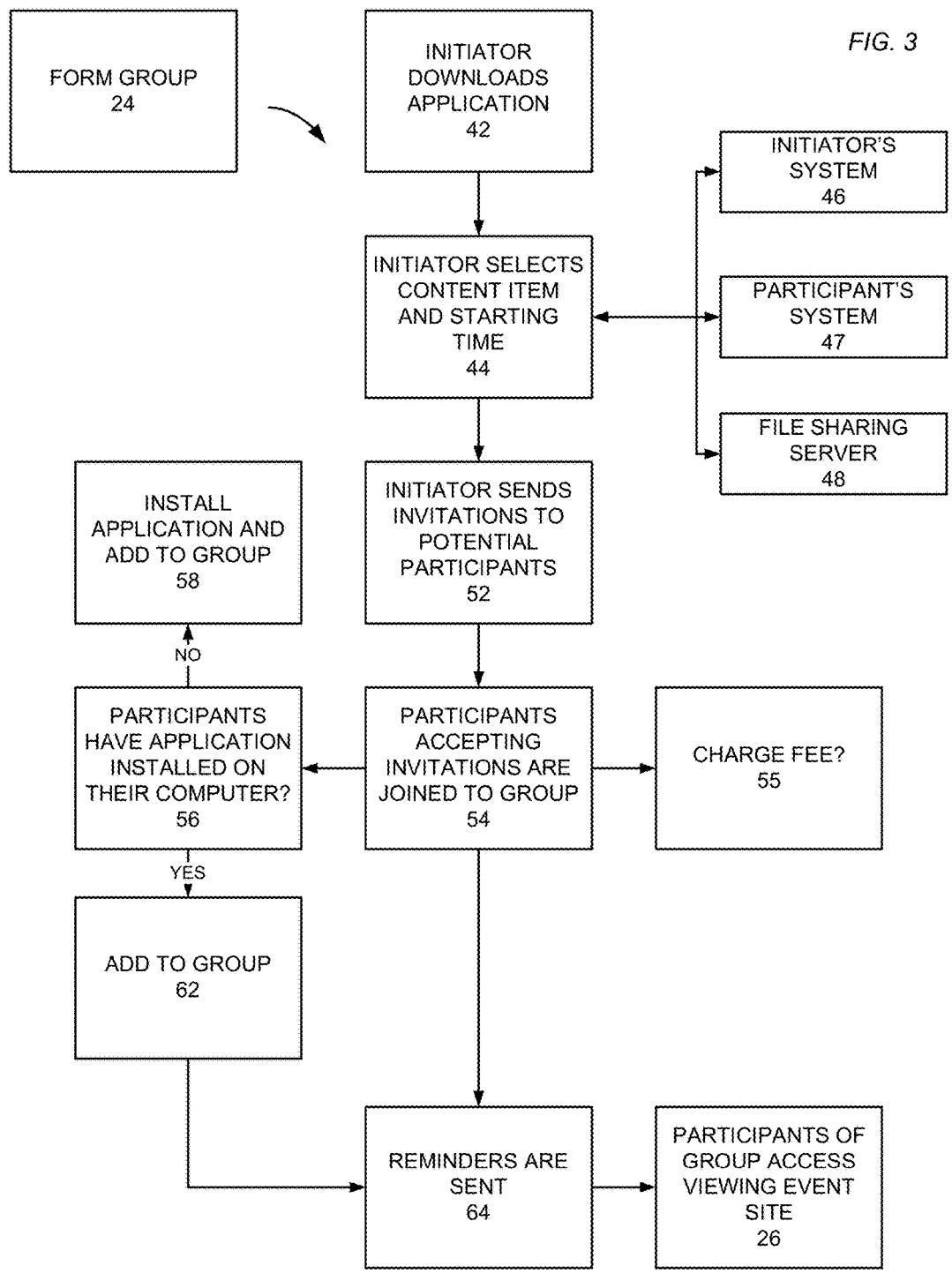
FIG. 3 illustrates a more detailed flowchart of certain steps of the methods of FIG. 2, in particular, the method of forming a group.

Referring to FIG. 3, the group participants access a viewing event site (step 26) situated on a server where software, which may be different from or may form part of the viewing event application, connects each participant together, including the initiator, authorized participants, etc. The steps of this portion of the method are noted in FIG. 3 as the blocks above the dotted line, and certain of these steps may occur even prior to the participant's accessing the viewing event site for participation in the viewing event.

In accessing the site, the participants may log onto the site using a code given them during or after installation of the viewing event application, or when the invitation was accepted (step 66). After code verification, all or a portion of the content item may be encrypted and downloaded to the participant's system (step 68). That is, one or more participants may have preloaded all or a portion of the content ahead of time in order to compensate for any bandwidth limitations that might exist on the participant's network connection. Alternatively, the participant's system's connection speed may be determined to be fast enough to allow the content item to be streamed directly to their system, without any need for pre-loading (step 72). As noted, these steps may also occur as part of a testing phase any time prior to the beginning of the viewing event. That is, the viewing event software may check for such bandwidth limitations prior to the beginning of the viewing event, and may make a determination automatically as to whether to perform a level of pre-loading based on this check.

In the event of pre-loading, each participant may receive a partial or full copy of the content item before the viewing event begins, but the copy may be encrypted so that it may only be played back by the viewing event application during the viewing event.

Figure 4:
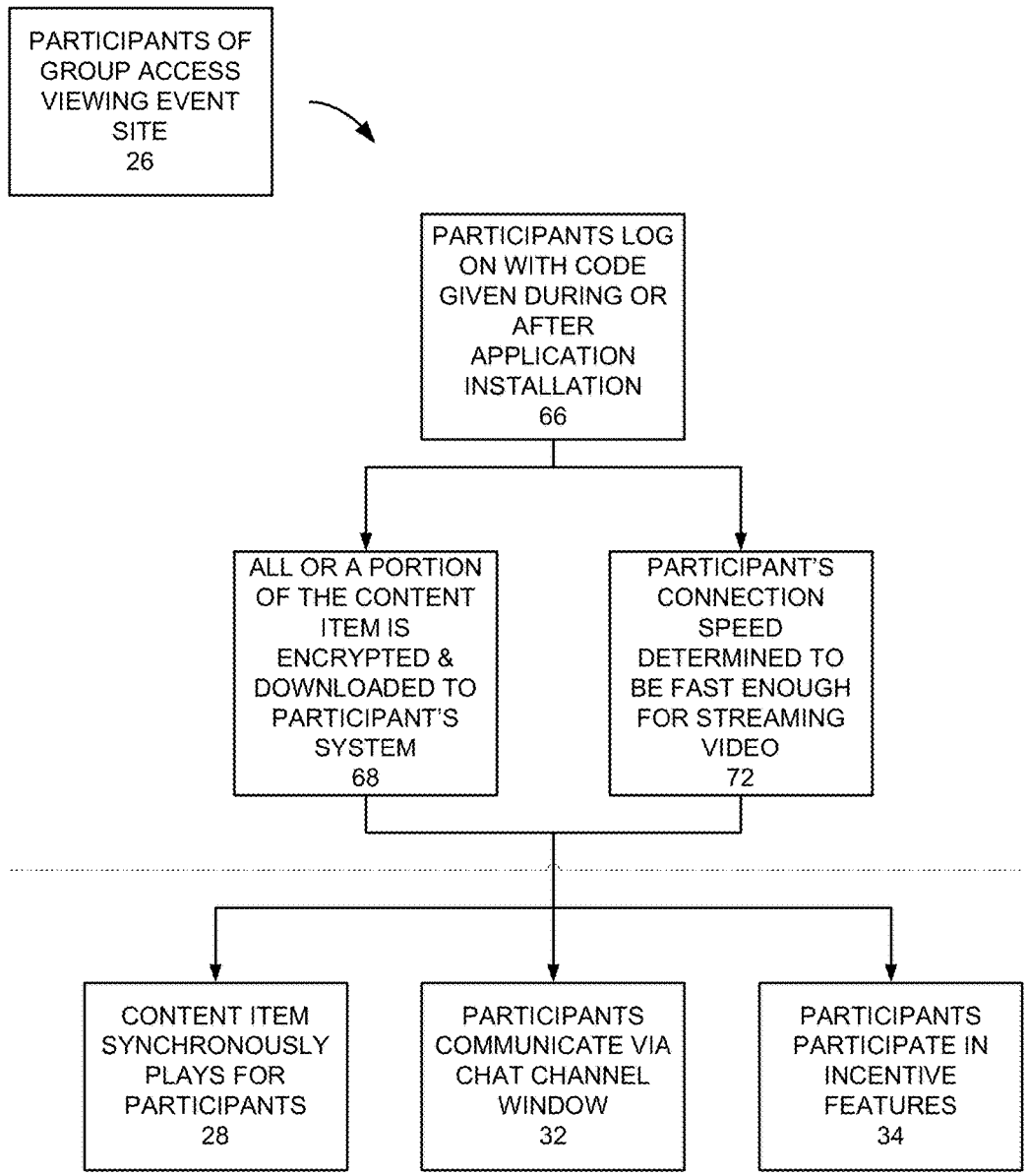
FIG. 4 illustrates a more detailed flowchart of certain steps of the methods of FIG. 2, in particular, the method of having group participants access a content site (the steps above the dotted line).

In any case, once the systems are connected in this way, and the content is either pre-loaded or ready to be streamed, synchronous playback may occur (step 28). Referring in addition to FIG. 4, a content item may synchronously play in one window pane on a participant's system (step 74). One or more participants may be granted a certain level of authorization (step 76), in which case they may be able to perform trick play on their own system or on the entire group's playback. That is, the playback of the movie may be controlled, e.g., pause, rewind, fast-forward, etc. The trick play may be synchronized for all viewers, with only the authorized participant being able to input commands, or any participant may be allowed to control the playback for all participants. In another implementation, the trick play may be for the playback for only one participant. In this case, functionality may also be facilitated to allow the entire stream or playback to be re-synchronized (step 78) so that all participants again view the content item starting from a common point in the playback. In this alternative embodiment, it may be that not all participants have to be resynchronized—some may be synchronized to others. Alternatively, an individual participant who has used trick play to affect that participant's playback can use a re-synchronize command to return that participant's playback to match that of the rest of the group (or a defined common point, such as the playback of the file server or the initiator).

Figure 5:
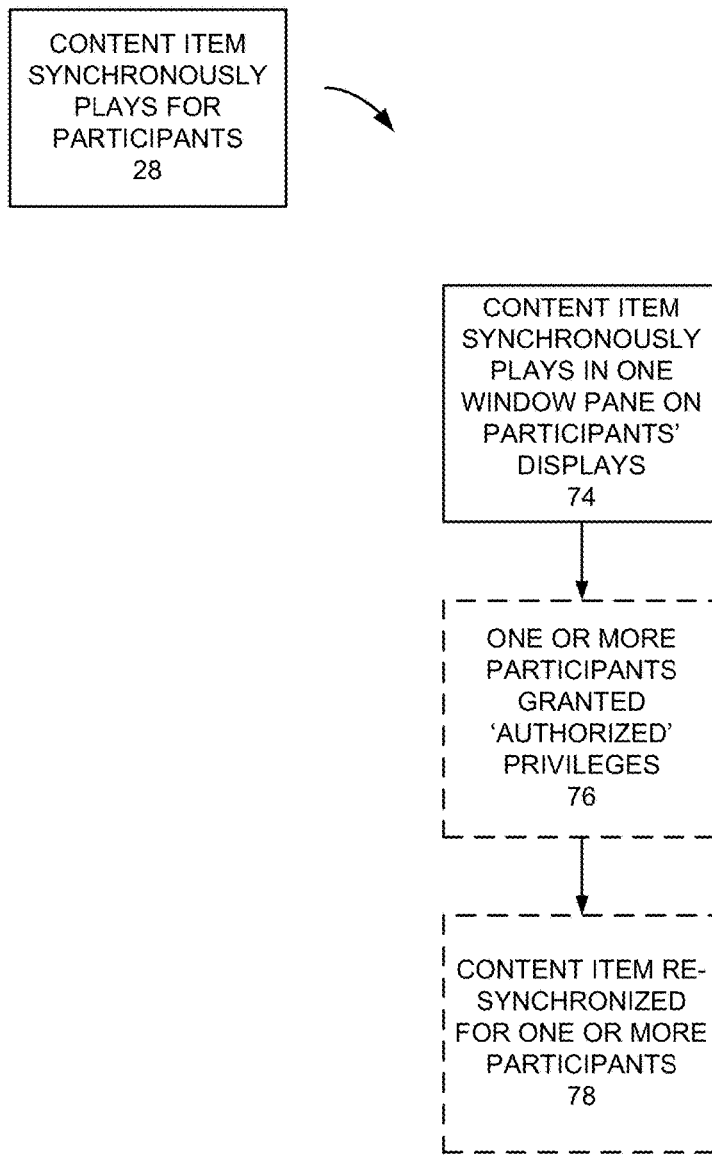
FIG. 5 illustrates a more detailed flowchart of certain steps of the methods of FIG. 2, in particular, the method of playing a content item synchronously.

Referring to FIG. 5, prior to, during, or following the playback of the content item, the participants can be presented with a number of options to hold chat channel sessions as a group or with other participants individually or in sub-groups (step 32). Such chat channel sessions allow the participants to interact about what is happening in a content item such as a movie, or indeed about anything else. The chat channel sessions may appear in a separate window pane (step 82). Various communication models may be implemented, such as a chat room lobby, chat rooms (step 84), private rooms (step 86), broadcasts, etc. In other implementations, different communications methods may be used, such as audio (e.g., VoIP chat) (step 88) or video (step 92), or channels through other devices (step 94) such as mobile phone text messaging. In some implementations, not all participants need to participate in the online communication or chat channel. For example, a participant can opt out of participating in or receiving messages (step 96). Some participants may not be able to participate, e.g., if the same are viewing the content item on a television that does not provide a text input interface.

Incentives for a Viewing Event

Figure 6:
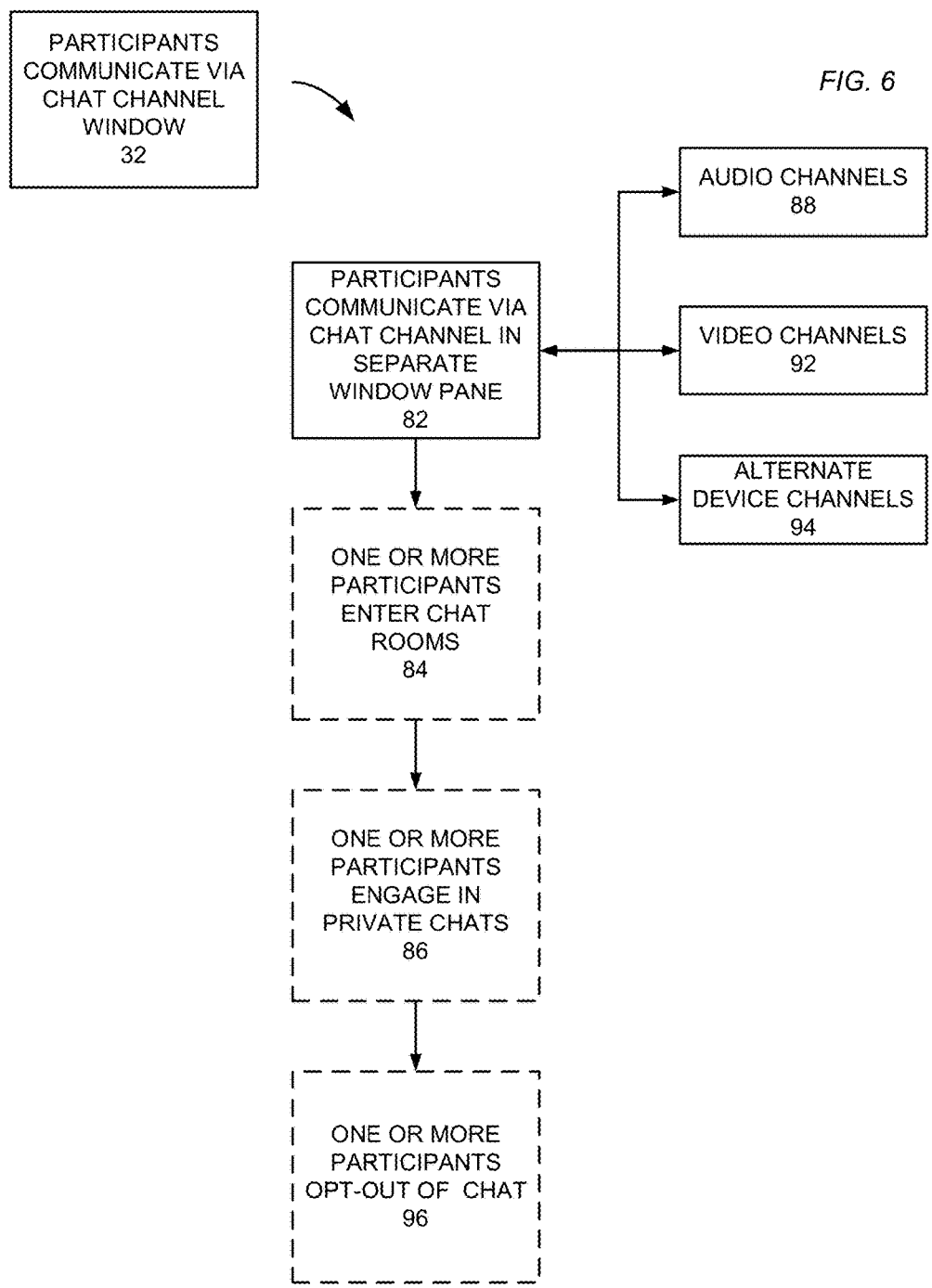
FIG. 6 illustrates a more detailed flowchart of certain steps of the methods of FIG. 2, in particular, the method of allowing group participants to communicate during playback of the content item.

Referring to FIG. 6, various incentive features may be provided (step 22). For example, the system may generate trivia items or other questions as the content item is played. Such questions can serve to foster discussion. In one implementation, trivia questions are presented as a contest (step 98). For each question, the participants have a chance to answer. A score can be kept and the participant with the most points can be announced at the conclusion of the viewing event. Other types of contests may also be presented to the participants. In one implementation, for a content item that is a movie, the winner of a contest receives a reward, such as money, discounts on merchandise or services, e.g., a discount on the purchase of the movie, digital or physical goods, e.g., screenshots from the movie or wallpaper for a PC, or a movie poster.

In a related implementation, the system may offer participants one or more items for purchase (step 102), such as an option to purchase a copy of the movie for an additional charge, or a physical good. As noted above, the product or service for sale option may be linked to performance in contests associated with the viewing event.

One implementation of the invention includes one or more programmable processors and corresponding computer system components to store and execute computer instructions, such as to provide a user interface, the file server, desktop and web-based applications, viewing event applications, and the content files. Users can access the systems through client computers with access to a network, such as the Internet.

Additional variations and implementations are also possible. For example, the content items can be any type of data files—audio, video, text, data, and so on. The network transfer of shared files between users can be encrypted or clear. The viewing event software can be stored on a server but downloaded automatically to users' systems for execution. The file-sharing server can support multiple levels of access for a shared file, for example, a preview version of a file can be made available to a large group or publicly and the full version only made available to a subset or to the group. While the term "computer" has been used, this term is intended to encompass any computing machine, including desktop computers, laptop computers, handheld computers, tablet computers, smart phones, personal digital assistants, and any other device to or from which data may be transferred. Various other examples could also be formulated given this teaching.

According to the present invention, as fully described above, systems and methods are provided for organizing and conducting viewing events, as well as for providing for communications between participants about and during the viewing event. Systems and methods are also provided for offering incentives before, during, or after the viewing event.

While the invention has been described with respect to certain embodiments, it should be clear to one of ordinary skill in the art, given this teaching, that the invention is much broader than the embodiments shown. For example, techniques according to embodiments of the invention may be applied to an IPTV stream and there may be a single public chat channel open to all viewers. Alternatively, groups of participants may set up separate events to create respective chat channels, though the groups may be watching the same content item. In one such case, the viewing interface also provides the mechanism for inviting and establishing a chat session related to an item of content. While communications have been described as particularly pertaining to "chat", communications among participants may allow for participant voting, e.g., on the quality of a mutually-viewed content item.

Accordingly, the description represents some, but not all, representations, and therefore the scope of this invention is to be limited only by the claims appended to this description.

What is claimed is:

1. A viewing event site server-based method of conducting a viewing event of a content item for a group of participants and for providing communications therebetween, comprising:
   a. receiving at a server corresponding to a viewing event site identification data about at least two viewing systems corresponding to potential participants of a group for a viewing event, wherein the identification data includes at least data about an account with a service associated with each viewing system, wherein the viewing event corresponds to a content item accessible to each viewing system through their respective service accounts on the viewing event site;
   b. transmitting from the viewing event site an invitation to the viewing systems corresponding to potential participants of the group and polling potential participants of the group about a commencement time of the viewing event;
   c. receiving a response to the invitation from one or more viewing systems corresponding to potential participants of the group, wherein if the response is to join the group, then creating the group of participants based on such responses and transmitting a code from the viewing event site to each participant of the group, the code allowing each participant of the group to access the content item through their service account on the viewing event site at or before a commencement time of the viewing event determined by the polling;
   d. determining whether to encrypt and pre-load a portion of the content item on a participant's system prior to commencement of the viewing event to compensate for bandwidth limitations that might exist on the participant's network connection, the encryption serving to disallow playback of the content item prior to commencement of the viewing event;
   e. at the commencement time of the viewing event, sending a signal to each viewing system of the group of participants, the signal acting to begin playback of the content item on each viewing system through their respective service account on the viewing event site, whereby the viewing event is begun;
   f. operating a chat channel for the group of participants before, during, or after the viewing event; and
   g. allowing trick playback of a content item by at least one authorized participant, and following trick playback of the content item by the authorized participant, resynchronizing all viewing systems of the group to a common location in the playback of the content item.

2. A non-transitory computer readable medium containing instructions for causing a computer to implement the method of claim 1.

3. The method of claim 1, wherein the signal is sent through or to a service associated with each service account.

4. The method of claim 3, wherein the signal is sent in a synchronized fashion to each viewing system.

5. The method of claim 3, wherein the signal is sent simultaneously to each viewing system.

6. The method of claim 3, where the signal is sent by the service.

7. The method of claim 1, where the viewing event site server is a server on a network associated with a game console.

8. The method of claim 1, where the content is streamed content.

9. The method of claim 8, where the streamed content is a videogame competition.

10. The method of claim 1, where the chat channel is operated by the viewing event site server.

11. The method of claim 1, where the chat channel is operated by a different server.

12. The method of claim 11, wherein the signal is sent by the different server.

13. The method of claim 1, where the signal is sent by the viewing event site server.

14. The method of claim 1, where the signal is sent by a different server.

15. The method of claim 1, where the signal is sent in response to user input.

16. The method of claim 1, further comprising, prior to the commencement time, transmitting a reminder to each of the viewing systems about the viewing event.

17. A server-based system for conducting and organizing a viewing event of a content item for a prearranged group of participants and for providing communications therebetween, comprising at least one server with the following modules implemented in hardware or software:
   a. an organization module, the organization module implemented in a non-transitory computer readable medium, the medium storing instructions to cause the server to perform steps of:
      i. receive at a server of a viewing event site identification data about at least two viewing systems corresponding to potential participants of a group for a viewing event, wherein the identification data includes at least data about a service account associated with each viewing system, wherein the viewing event corresponds to a content item accessible to each viewing system through their respective service account on the viewing event site;
      ii. transmit from the viewing event site an invitation to the viewing systems corresponding to potential participants of the group; and
      iii. receive a response to the invitation from one or more viewing systems corresponding to potential participants of the group, wherein if the response is to join the group, then create the group of participants based on such responses and transmit a code to each participant of the group, the code allowing each participant of the group to access the content item through their service account on the viewing event site at or before a commencement of the viewing event;
   b. a viewing event module, the viewing event module implemented in the non-transitory computer readable medium, the medium storing instructions to cause the server to perform steps of:
      i. prior to the commencement, accessing one or more viewing systems to conduct a diagnostic check to ensure the viewing event will operate properly on the viewing systems;
      ii. also prior to the commencement, determining whether to encrypt and pre-load a portion of the content item on a participant's system prior to commencement of the viewing event to compensate for bandwidth limitations that might exist on the participant's network connection, the encryption serving to disallow playback of the content item prior to commencement of the viewing event;
      iii. at the commencement of the viewing event, send a signal to each viewing system of the group of participants, the signal acting to cause playback of the content item on each viewing system through their respective service account on the viewing event site, whereby the viewing event is begun;
      iv. operate a chat channel for the group of participants before, during, or after the viewing event; and
      v. al low trick playback of a content item by at least one authorized participant, and following trick playback of the content item by an authorized participant, resynchronize all group systems to a common location in the playback of the content item.

18. A viewing event site server-based method of conducting a viewing event of a content item for a group of participants and for providing communications therebetween, comprising:
   a. receiving at a server corresponding to a viewing event site identification data about at least two viewing systems corresponding to potential participants of a group for a viewing event, wherein the identification data includes at least data about a service account associated with each viewing system, wherein the viewing event corresponds to a content item accessible to each viewing system through their respective service accounts on the viewing event site;
   b. transmitting from the viewing event site an invitation to the viewing systems corresponding to potential participants of the group;
   c. receiving a response to the invitation from one or more viewing systems corresponding to potential participants of the group, wherein if the response is to join the group, then creating the group of participants based on such responses and transmitting a code to each participant of the group, the code allowing each participant of the group to access the content item through their service account on the viewing event site at or before a commencement of the viewing event;
   d. determining whether to encrypt and pre-load a portion of the content item on a participant's system prior to commencement of the viewing event to compensate for bandwidth limitations that might exist on the participant's network connection, the encryption serving to disallow playback of the content item prior to commencement of the viewing event;
   e. at the commencement of the viewing event, sending a signal to each viewing system of the group of participants, the signal acting to begin playback of the content item on each viewing system through their respective service account on the viewing event site, whereby the viewing event is begun;

f. operating a chat channel for the group of participants before, during, or after the viewing event; and
g. allowing trick playback of a content item by at least one authorized participant, and following trick playback of the content item by the authorized participant, resynchronizing, by the server, a first portion of the viewing systems of the group to a common location in the playback of the content item, wherein a second portion of the viewing systems, different from the first portion, is resynchronized to a common location in the playback of the content item by being synchronized to one or more of the first portion, the second portion not being resynchronized by the server.

* * * * *

UNITED STATES PATENT AND TRADEMARK OFFICE
CERTIFICATE OF CORRECTION

PATENT NO. : 10,116,995 B2
APPLICATION NO. : 14/479721
DATED : October 30, 2018
INVENTOR(S) : Don Charles Eklund, II et al.

It is certified that error appears in the above-identified patent and that said Letters Patent is hereby corrected as shown below:

On the Title Page (72): Inventors should read:
Don Charles Eklund II, Yorba Linda, CA (US); Ben Feingold, Beverly Hill, CA (US)

Signed and Sealed this
Twenty-fifth Day of December, 2018

Andrei Iancu
*Director of the United States Patent and Trademark Office*